(12) United States Patent
Williams et al.

(10) Patent No.: US 7,184,025 B2
(45) Date of Patent: Feb. 27, 2007

(54) ALTERING A DISPLAY ON A VIEWING DEVICE BASED UPON A USER CONTROLLED ORIENTATION OF THE VIEWING DEVICE

(75) Inventors: Lyndsay Williams, Giton (GB); Andrew Blake, Stapleford (GB)

(73) Assignee: Microsoft Corporation, Redmond, WA (US)

(*) Notice: Subject to any disclaimer, the term of this patent is extended or adjusted under 35 U.S.C. 154(b) by 430 days.

(21) Appl. No.: 10/159,851

(22) Filed: May 31, 2002

(65) Prior Publication Data
US 2003/0234797 A1 Dec. 25, 2003

(51) Int. Cl.
G09G 5/00 (2006.01)
(52) U.S. Cl. .................... 345/169; 345/660
(58) Field of Classification Search ........ 345/156–179, 345/660
See application file for complete search history.

(56) References Cited

U.S. PATENT DOCUMENTS

| | | | |
|---|---|---|---|
| 4,504,701 A | 3/1985 | Lucchesi | |
| 5,329,577 A | 7/1994 | Norimatsu | |
| 5,337,353 A | 8/1994 | Boie et al. | |
| 5,481,595 A | 1/1996 | Ohashi et al. | |
| 5,543,588 A * | 8/1996 | Bisset et al. | 178/18.06 |
| 5,602,566 A * | 2/1997 | Motosyuku et al. | 345/684 |
| 5,657,372 A | 8/1997 | Ahlberg et al. | |
| 5,661,632 A | 8/1997 | Register | |
| 5,689,665 A | 11/1997 | Mitsui et al. | |
| 5,705,997 A | 1/1998 | Park | |
| 5,712,911 A | 1/1998 | Her | |
| 5,714,997 A | 2/1998 | Anderson | |
| 5,761,071 A | 6/1998 | Bernstein et al. | |
| 5,860,016 A | 1/1999 | Nookala et al. | |
| 5,910,882 A | 6/1999 | Burrell | |
| 5,924,046 A | 7/1999 | Martensson | |
| 5,963,952 A | 10/1999 | Smith | |

(Continued)

FOREIGN PATENT DOCUMENTS

| | | |
|---|---|---|
| JP | 8-292826 A | 11/1996 |
| JP | 2000-124970 A | 4/2000 |
| JP | 2001-94636 A | 4/2001 |
| WO | WO 98/14863 | 4/1998 |
| WO | WO 99/22338 | 5/1999 |

OTHER PUBLICATIONS

RotoView™ By Innoventions, How It Works.

(Continued)

*Primary Examiner*—Richard Kuerpe
*Assistant Examiner*—Duc Dinh
(74) *Attorney, Agent, or Firm*—Merchant & Gould P.C.

(57) ABSTRACT

A method, apparatus, and article of manufacture altering a displayed image presented to a user on a viewing device using a user-controlled orientation of the viewing device to determine how the displayed image is to be presented. The viewing device includes a plurality of tilt sensors that are used to determine the orientation of the viewing device. As the user moves the orientation of the viewing device, the tilt sensors detect the change in the device orientation. These changes in orientation are used to alter the image being displayed upon the viewing device.

7 Claims, 9 Drawing Sheets

U.S. PATENT DOCUMENTS

| | | | |
|---|---|---|---|
| 5,995,852 A | | 11/1999 | Yasuda et al. |
| 6,115,025 A | * | 9/2000 | Buxton et al. ............. 345/659 |
| 6,137,468 A | | 10/2000 | Martinez et al. |
| 6,201,554 B1 | | 3/2001 | Lands |
| 6,216,016 B1 | | 4/2001 | Cronin |
| 6,246,862 B1 | | 6/2001 | Grivas et al. |
| 6,259,787 B1 | | 7/2001 | Schulze |
| 6,288,704 B1 | | 9/2001 | Flack et al. |
| 6,292,674 B1 | | 9/2001 | Davis |
| 6,304,765 B1 | | 10/2001 | Cosgrove et al. |
| 6,310,955 B1 | | 10/2001 | Reeves |
| 6,374,145 B1 | | 4/2002 | Lignoul |
| 6,381,540 B1 | | 4/2002 | Beason et al. |
| 6,408,187 B1 | | 6/2002 | Merriam |
| 6,426,736 B1 | | 7/2002 | Ishihara |
| 6,449,363 B1 | | 9/2002 | Kielsnia |
| 6,466,198 B1 | | 10/2002 | Feinstein .................... 345/158 |
| 6,491,632 B1 | * | 12/2002 | Taylor ........................ 600/443 |
| 6,509,907 B1 | | 1/2003 | Kuwabara |
| 6,516,202 B1 | | 2/2003 | Hawkins et al. |
| 6,542,436 B1 | | 4/2003 | Myllyla |
| 6,560,466 B1 | | 5/2003 | Skorko |
| 6,567,068 B2 | | 5/2003 | Rekimoto |
| 6,567,101 B1 | | 5/2003 | Thomas |
| 6,573,883 B1 | | 6/2003 | Bartlett |
| 6,621,800 B1 | | 9/2003 | Klein |
| 6,624,824 B1 | | 9/2003 | Tognazzini et al. |
| 6,631,192 B1 | | 10/2003 | Fukiharu |
| 6,658,272 B1 | | 12/2003 | Lenchik et al. |
| 6,822,683 B1 | | 11/2004 | Torikai |
| 6,931,592 B1 | | 8/2005 | Ramaley et al. |
| 6,970,182 B1 | | 11/2005 | Schultz et al. |
| 2001/0044318 A1 | | 11/2001 | Mantyjarvi et al. |
| 2002/0021278 A1 | | 2/2002 | Hinckley et al. |
| 2002/0167488 A1 | | 11/2002 | Hinckley et al. |
| 2003/0085870 A1 | | 5/2003 | Hinckley |
| 2003/0104800 A1 | | 6/2003 | Zak |
| 2003/0133629 A1 | | 7/2003 | Sayers |
| 2003/0176205 A1 | | 9/2003 | Oota et al. |

OTHER PUBLICATIONS

RotoView™ By Innoventions, The Instuitive Display Navigation Solution for Hand Held Devices.

RotoView™ By Innoventions, Features and Specifications.

RotoView™, By Innoventions, The Intuitive Display Navigation solution for Hand Held Devices.

Innoventions' RotoView™, The Intuitive Display Navigation Solution for Hand Held Devices, Background and problem definition.

Bartlett, J.F., "Rock 'n' Scroll Is Here to Stay," IEEE Computer Graphics and Applications, pp. 40-45, May/Jun. 2000).

Harrison, Beverly L. et al., "Squeeze Me, Hold Me, Tilt Me An Exploration of Manipulative User Interfaces," pp. 17-24 (Apr. 18-23, 1998), CHI '98.

Rekimoto, Jun, "Tilting Operations for Small Screen Interfaces (Tech Note)," pp. 167-168, UIST '96.

Schmidt, Albrecht, "Implicit Human Computer Interaction Through Context," pp. 1-5, 2nd Workshop on Human Computer Interaction with Mobil Devices, 1999.

Schmidt, Albrecht et al., "There Is More to Context Than Location," Enviroment Sensing Technologies for Adaptive Mobile User Interfaces, 5 pages, IMC '98.

Small, David et al., "Design of Spatially Aware Graspable Displays," Extended Abstracts of CHI '97, pp. 1-2 (Mar. 22-27, 1997).

Schmidt, Albercht et al., "Advanced Interaction in Context," 13 pages, HUC '00.

One page (19) from Technology Review dated Mar. 2002.

Hinckley, et al., "Sensing Techniques for Mobile Interaction," CHI Letters vol. 2:2; Copyright 2000, ACM 1-55113-232-3, pp. 91-100.

* cited by examiner

ALTERING A DISPLAY ON A VIEWING DEVICE BASED UPON A USER CONTROLLED ORIENTATION OF THE VIEWING DEVICE

TECHNICAL FIELD

The invention relates generally to a controlling a display of an electronic image viewing device and more particularly to a system, method and article of manufacture for altering a display on a viewing device based upon a user controlled orientation of the viewing device.

BACKGROUND

Computing systems are routinely used to display images of objects for a wide variety of purposes. Typically, these images are 2D images that present a static representation of an object. Many applications that use such images of objects find 2D static images less than desirable as they do not present a complete representation of the object to the view. For example, a buyer of watches shopping over the Internet may wish to see the watch from different perspectives to see how the face of the watch appears when reading the displayed time as well as to see how thick the watch is as it is worn on a wrist.

Image display systems have also been developed to allow a user to pan and scroll around an object to see the object from differing perspectives. Such systems typically provide a user with a flat, 2D image that provides a panoramic view of all sides of an object while allowing a user to see a portion of the image as if the user was rotating the object. Such systems are an improvement over the flat 2D image of an object; however, these images still do not provide a true perspective view of the object in a 3D concept.

When a user views items like a watch, a user would like to see the object as if it was located within a specimen box. In such a system, the user may see different perspectives of the item by "changing the orientation of the box" to obtain a different view of the object within the box. This approach will address the need to provide a 3D perspective of the item within the confines of a 2D window into the box and thus address limitations existing in earlier image presentation systems.

SUMMARY

The present invention relates to a method, apparatus, and article of manufacture for altering a display on a viewing device based upon a user-controlled orientation of the viewing device. A system in accordance with the principles of the present invention includes a system for altering a computer generated image of an object displayed upon a display device. The system includes a display device orientation measurement module for obtaining a measure of a spatial orientation of the display device and a hand-held processing module for generating the computer generated image of an object. The computer generated image of the object is generated using the measurements of the spatial orientation of the display device to determine a displayed orientation of the object.

Another aspect of the present invention is a computer implemented method, and corresponding computer program data product, for altering a computer generated image of an object displayed upon a display device where the display device has a display device orientation measurement module for obtaining a measure of a spatial orientation of the display device. The method obtains a set of orientation measurements for the display device from the display device orientation measurement module, generates a transformation matrix using the set of orientation measurements for use in generating the computer generated image of an object, and applies the transformation matrix to all visible points within the computer generated image of an object.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION

The present invention relates to a system, method and article of manufacture for altering a display on a viewing device based upon a user controlled orientation of the viewing device.

Figure 1:
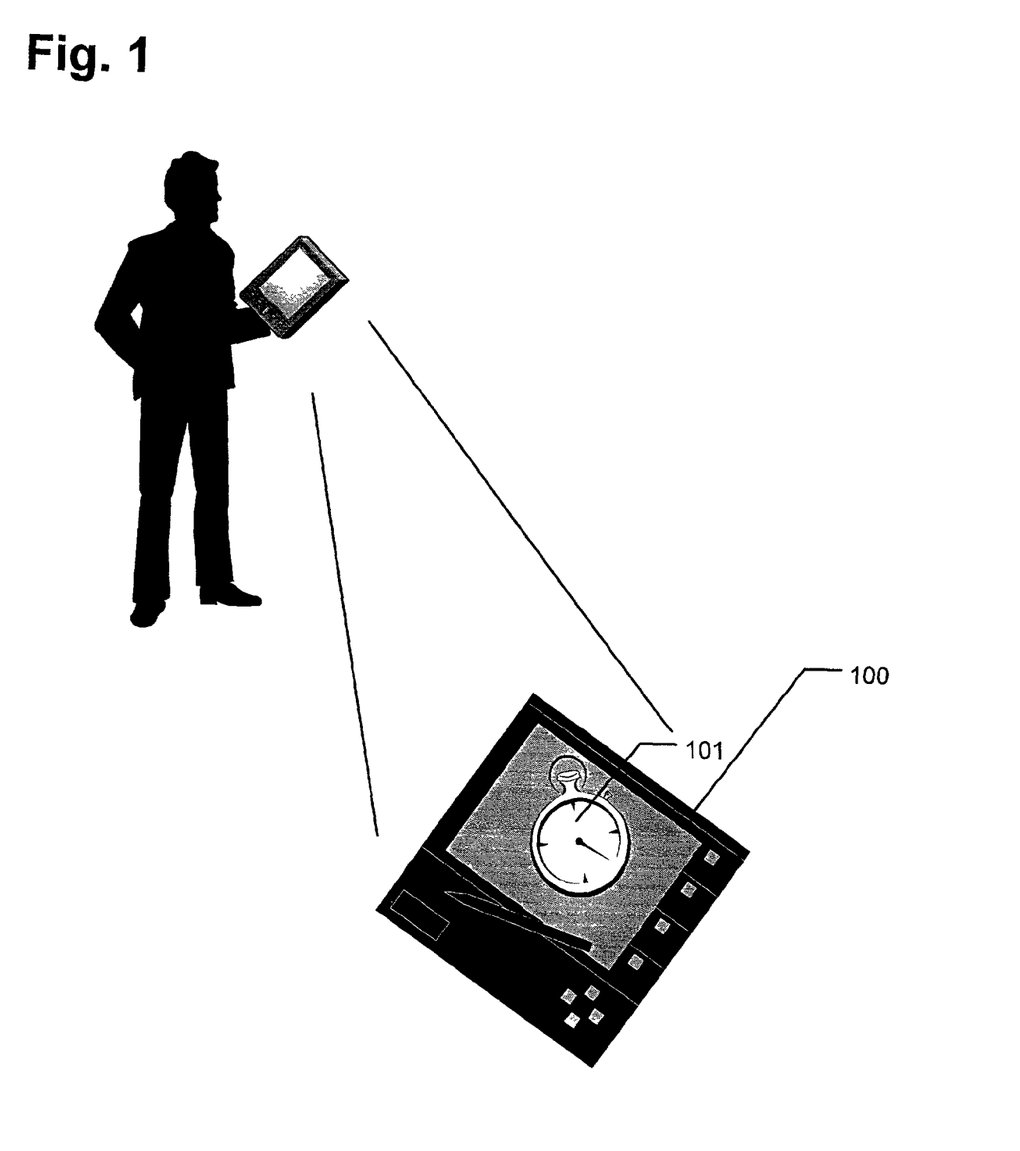
FIG. 1 illustrates a user of a hand-held computing device to altering an image displayed upon the hand-held computing device according to one embodiment of the present invention.

FIG. 1 illustrates a user of a hand-held computing device to altering an image displayed upon the hand-held computing device according to one embodiment of the present invention. A user holds a hand-held computer 100, such as a personal digital assistant (PDA) device like a Pocket PC computer or a pen-based Tablet PC computer, that displays a 3D image of an object 101. As the user changes the orientation of the hand-held computer 100, the orientation of the 3D image of the object 101 changes to provide an altered orientation of the object. The image of the object 101 appears to provide the user with the view of the object as if the hand-held computer acted as a specimen box containing a physical representation of the object 101. In such a specimen box, a view of an item changes as the orientation of the box is a varied.

The orientation of the hand-held computer 100 is provided using one or more accelerometers, or tilt-sensors, that are mounted onto or within the hand-held computer 100. As the hand-held computer is moved relative to the Earth's gravitational field, the change in orientation may be detected. These sensor inputs may be repetitively sampled to allow the 3D image of the object to be continuously updated. Examples of tilt sensors that may be used in such a system include an ADXL202 device from ANALOG DEVICES, of Norwood, Mass. This device provides a complete 2-axis accelerometer with a measurement range of ±2 g. The ADXL202 can measure both dynamic acceleration (e.g., vibration) and static acceleration (e.g., gravity). This device may also be used to measure rotation of a screen similar as to how points of the compass are measured. In one embodiment, a device to provide this compass functionality is a PNI electronic compass from PNI Corp, of Santa Rosa, Calif.

Figure 2A:
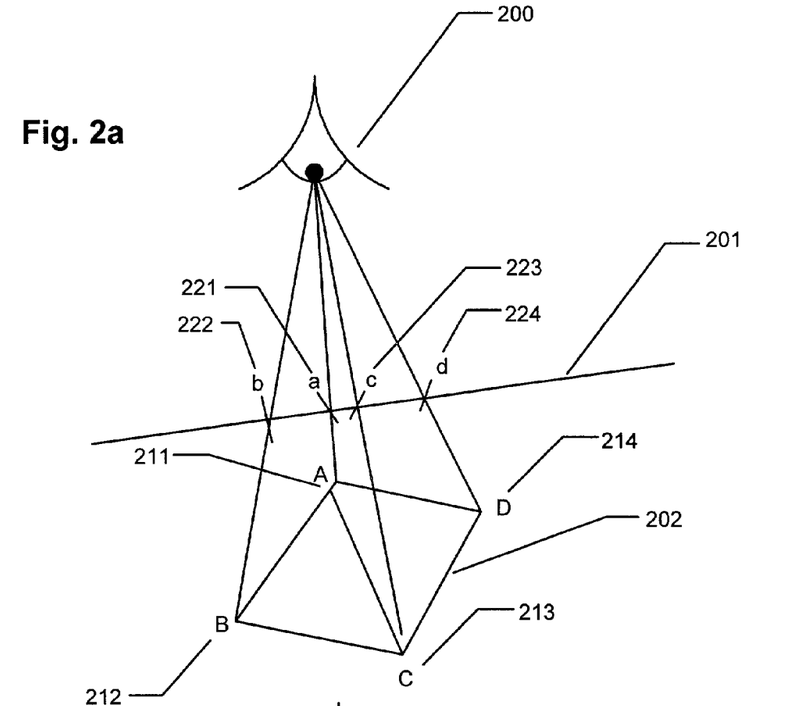
FIG. 2 illustrates geometry for an object projected onto a screen of a hand-held computing device appearing to display a solid object within its physical dimensions according to one possible embodiment of the present invention.
Figure 2B:
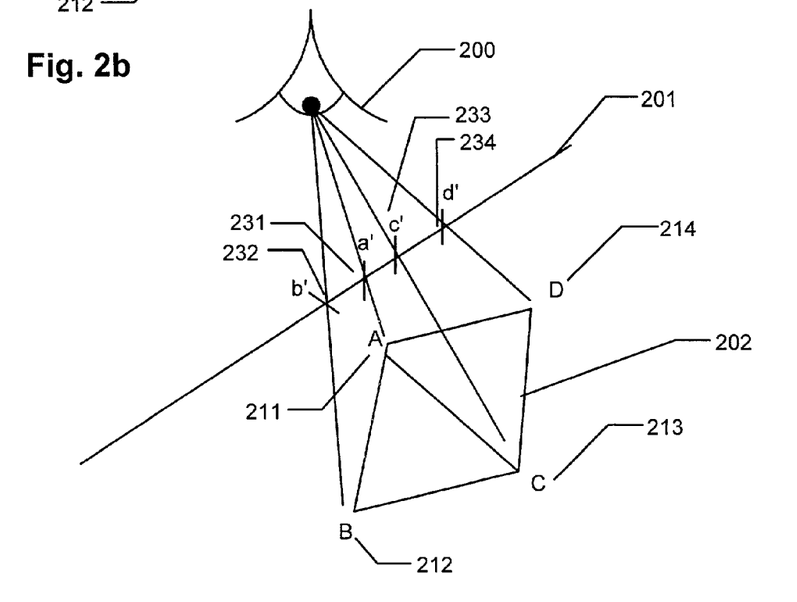

FIGS. 2a and 2b illustrates geometry for an object projected onto a screen of a hand-held computing device appearing to display a solid object within its physical dimensions according to one possible embodiment of the present invention. FIG. 2a illustrates an object 202 viewed by a user 200 as it appears on a screen 201 of a computing device 100. FIG. 2a shows the object 202 and screen 201 of the device 100 in a first orientation. FIG. 2b illustrates the same object 202 and screen 201 after they have been changed to a second orientation. The user 200 observes various points on the object 202, such as object corners A 211, B 212, C 213, and D 214 as images pixels located on the screen 201 and corresponding locations a 221, b 222, c 223, and d 224. The screen points a 221, b 222, c 223, and d 224 are found by projecting the object onto the screen 201 as viewed by the user 200.

When the orientation of computer 100 is changed in FIG. 2b, the screen 201 and object 202, and its corner points A 211, B 212, C 213, and D 214 remain in the same orientation relative to each other. However, a new set of screen points a' 231, b' 232, c' 233, and d' 234 are created. These screen points 231–234, which represent the image of the object 202 are different for each orientation of the computer 100. The changes in the screen points may be easily seen by comparing the relative distances between screen points b→a and a→c in FIG. 2a with the corresponding distances b'→a' and a'→c' in FIG. 2b. These changes arise because of the effects of parallax on the observations of the object 202 as seen by the user 200. By measuring the orientation and changing the projection of a digital representation of the object 202 onto the screen 201, the desired effect of creating a specimen box is achieved.

Other visual effects such lighting changes due to other light sources may be added to the representations of the points on the object 202 without deviating from the spirit and scope of the present invention as recited in the attached claims. Additionally, the object 202, which is a digital representation of a physical object, may itself be a static object or a "live" object that moves within the field of view of the screen. In this latter case, the computer 100 will move the object within the field of view of the computer and the updated 3D image will then be projected upon the screen 201 to provide the desired effects.

Figure 3:
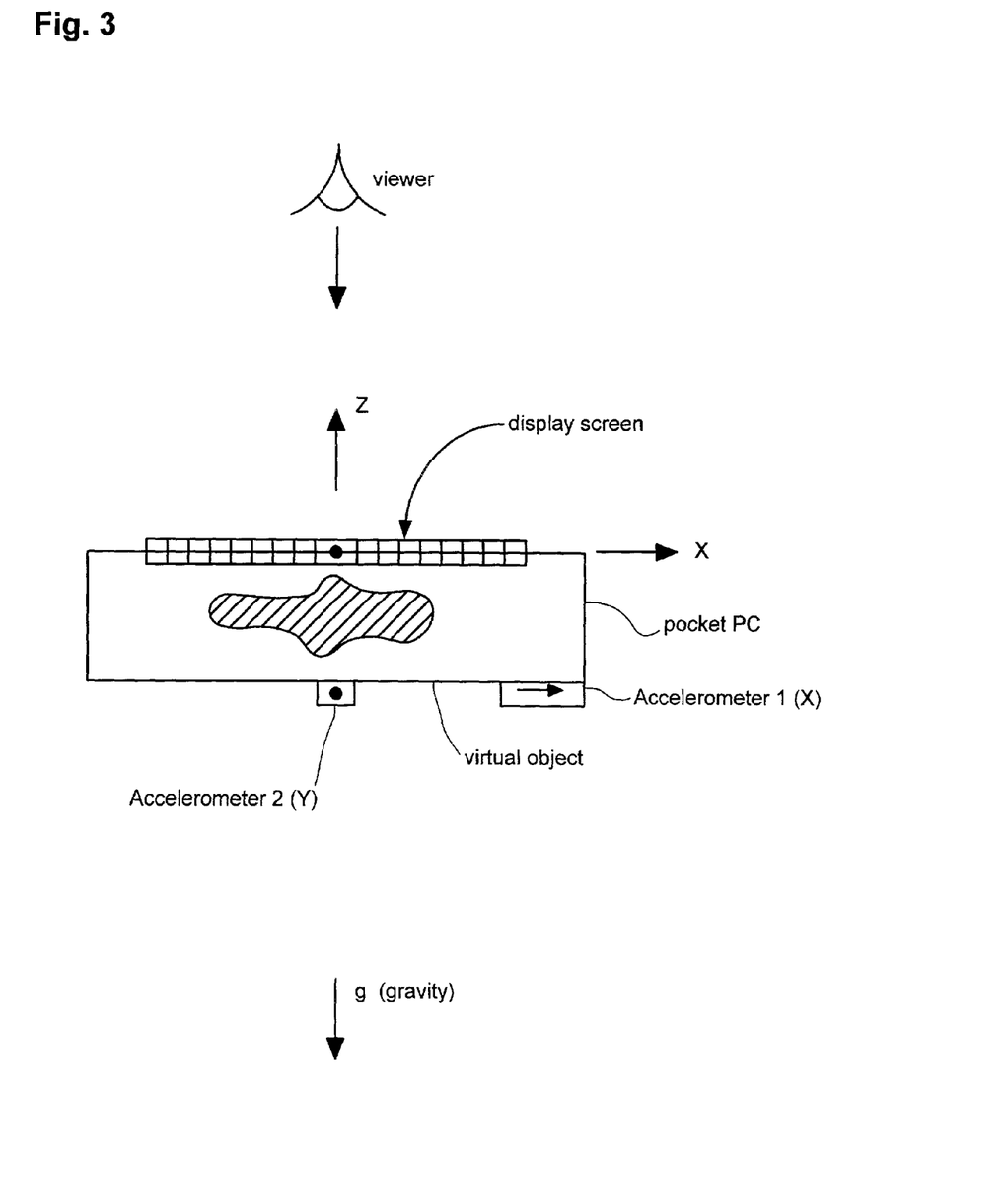
FIG. 3 illustrates a hand-held computing device appearing to display a solid object within its physical dimensions according to another embodiment of the present invention.

FIG. 3 illustrates a hand-held computing device appearing to display a solid object within its physical dimensions according to another embodiment of the present invention. At the heart of present invention is a projection formula. This process is what makes the simulated object inside the pocket PC (think of it as a "specimen box" whose glass lid is the screen) look right. Accelerometers on the device provide output signals whose values determines the necessary "oblique projection" matrix.

Before one may understand the process of the present invention, a definition of various coordinates is needed. World coordinates in the frame of the pocket PC are:

$$R = \begin{pmatrix} X \\ Y \\ Z \end{pmatrix}$$

FIG. 2 shows viewing geometry in the standard "home" configuration, in which the viewer looks directly down on device. FIG. 3 shows a general configuration, in which pocket PC is tilted to an angle.

Accelerometers attached to device give outputs:

$$a = \begin{pmatrix} a_X \\ a_Y \end{pmatrix}$$

in units of earth's gravity g—i.e. $a_x=1$ is one gravity unit, and will occur when the pocket PC is rotated, about its Y-axis, through 90 degrees from the horizontal.

Accelerometer outputs a are used to define a "control" signal u:

$$u = \begin{pmatrix} u_X \\ u_Y \end{pmatrix}$$

All projections here are done as for a viewer at infinity— i.e. affined approximation to the full projective form. An exact projective form could be used instead, in which case the exact distance from PC to viewer needs to be known. In the absence of such information, the affined approximation is effectively assuming that the dimensions of the "specimen box" are small compared with the viewer-PC distance.

In the standard configuration of FIG. 3, the formula for the "display" projection onto the screen is $$R_{screen} = PR \quad (1)$$

where $$P = \begin{pmatrix} 1 & 0 & 0 \\ 0 & 1 & 0 \\ 0 & 0 & 0 \end{pmatrix} \quad (2)$$

It is understood that this projection is combined with hidden surface removal, using a z-buffer display algorithm or other standard method. With an oblique projection as in FIG. 4, the general viewer configuration is driven from accelerometer outputs a as follows.

Iterate at successive time intervals, as follows:
1. Given raw accelerometer outputs, solve for $\theta \in [-\pi,\pi]$ and $\phi \in [0,\pi]$ in $$a = \begin{pmatrix} \cos\theta \\ \sin\theta \end{pmatrix} \sin\theta \quad (3)$$

to obtain the gravity vector in polar form $(\theta, \phi)$.

2. Now compute the control vector $$u = \begin{pmatrix} \cos\theta \\ \sin\theta \end{pmatrix} \tan\phi \quad (4)$$

3. Then define a 3D, affine, oblique projection matrix M $$M = \begin{pmatrix} 1 & 0 & u_X \\ 0 & 1 & u_Y \\ 0 & 0 & 1 \end{pmatrix} \quad (5)$$

4. Apply M to each visible point R of the virtual object:

$$R \rightarrow MR \quad (6)$$

5. Apply the standard display projection of equation (1), including hidden surface removal, to each visible point R.

Figure 4:
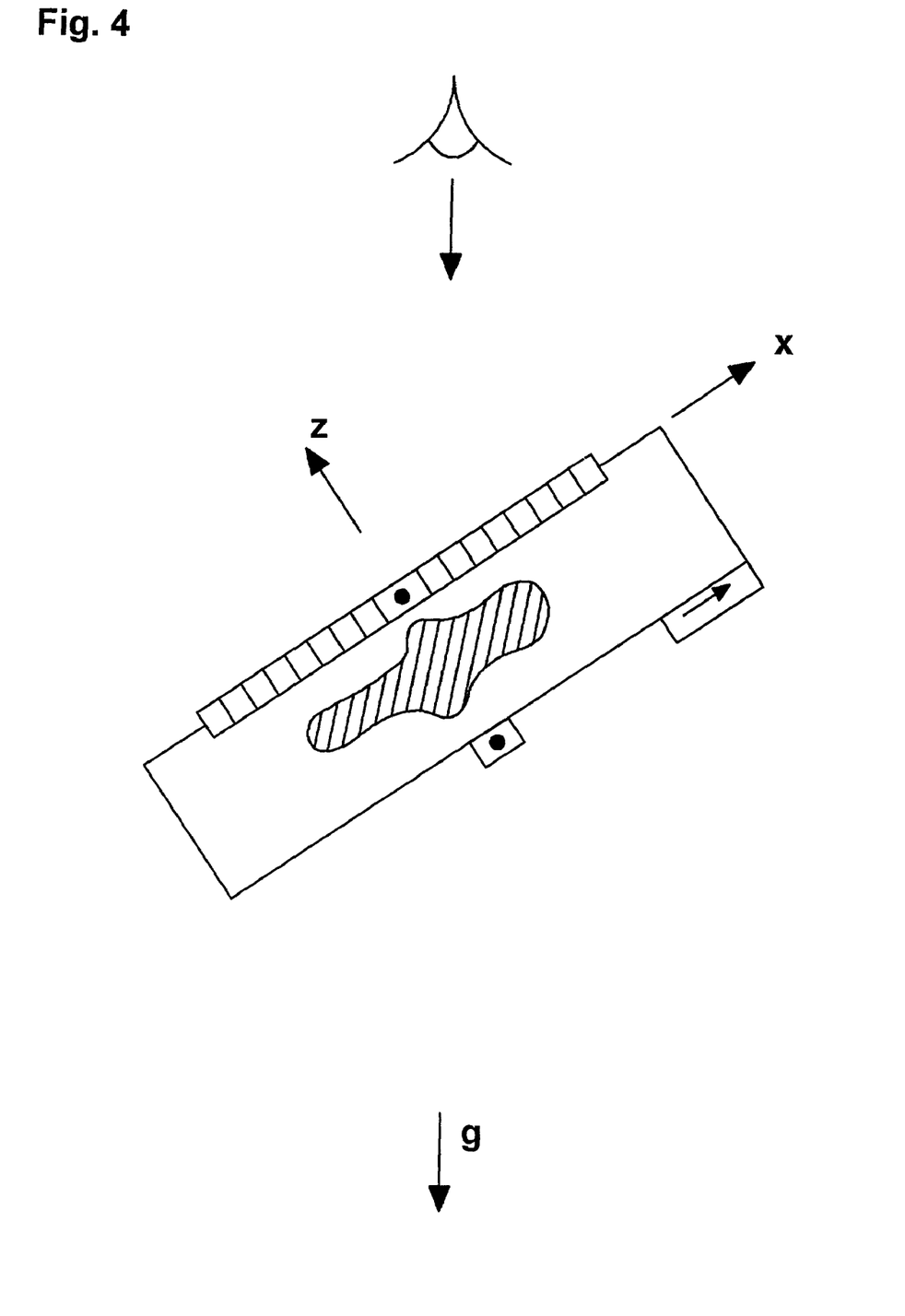
FIG. 4 illustrates a hand-held computing device appearing to display a solid object within its physical dimensions at an altered orientation according to an example embodiment of the present invention.
Figure 5:
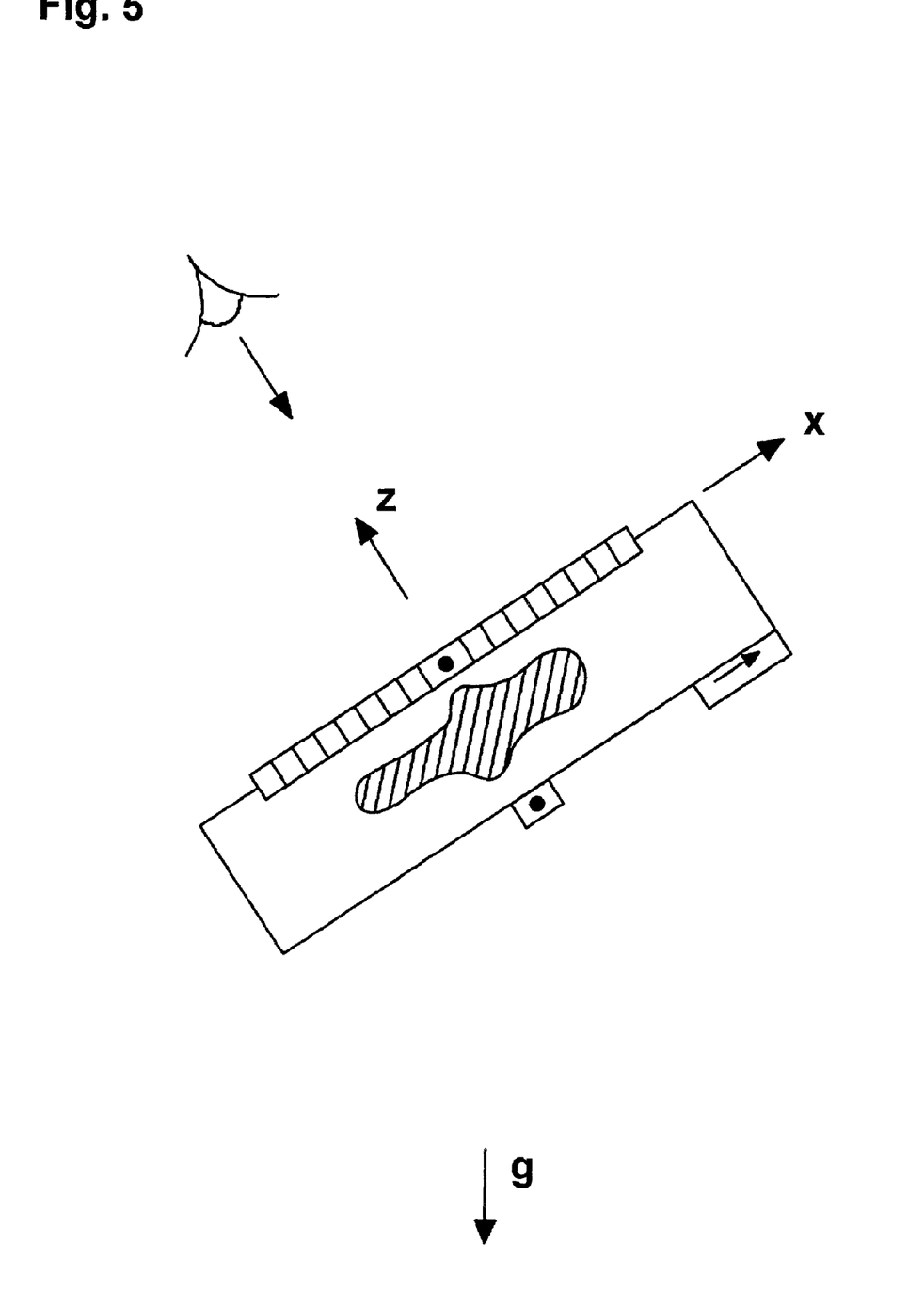
FIG. 5 illustrates a hand-held computing device appearing to display a solid object within its physical dimensions at an altered orientation and having a different user orientation relative to the computing device according to another example embodiment of the present invention.
Figure 6:
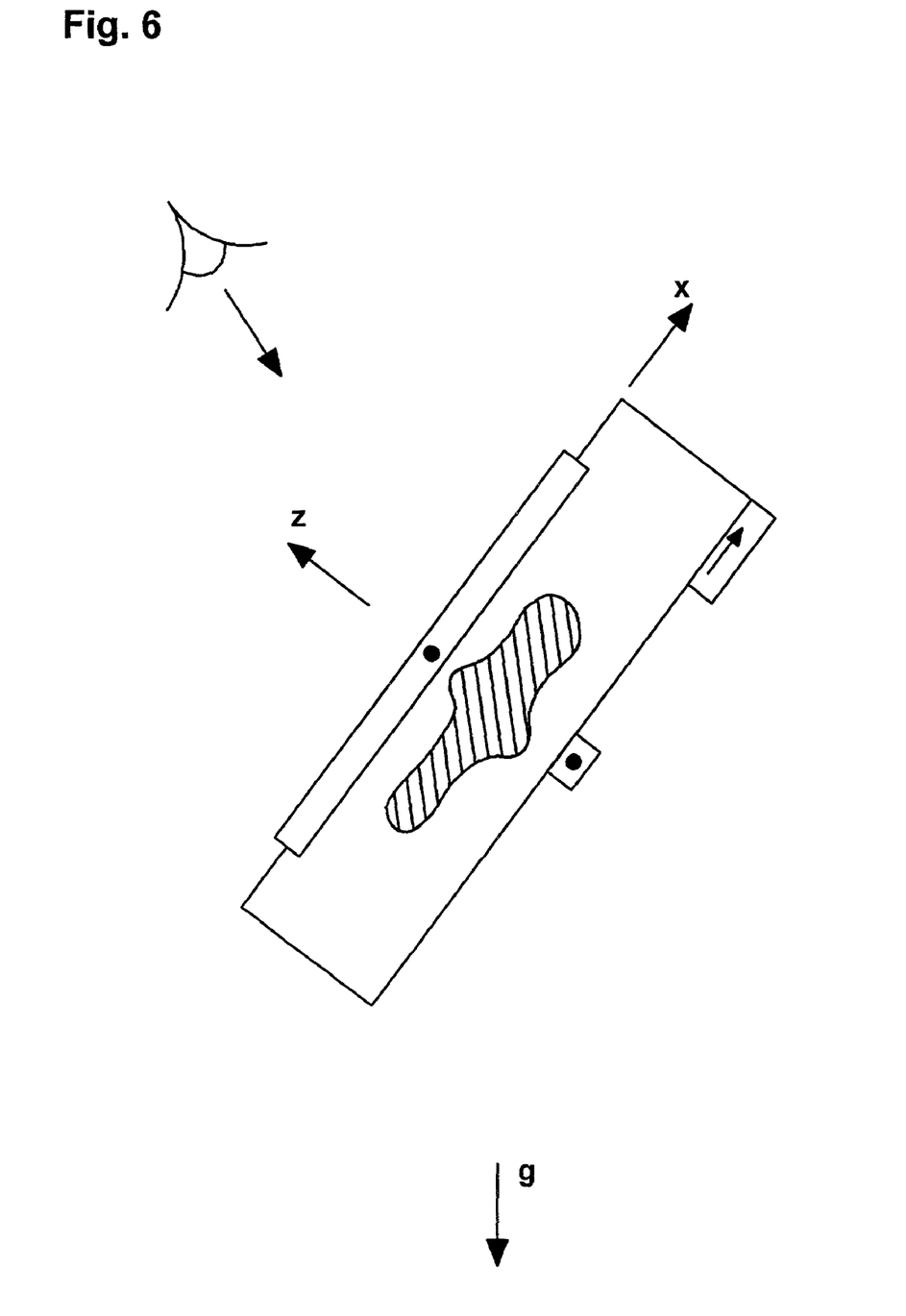
FIG. 6 illustrates a hand-held computing device appearing to display a solid object within its physical dimensions at an additional altered orientation and having a different user orientation relative to the computing device according to another example embodiment of the present invention.

FIG. 5 illustrates a hand-held computing device appearing to display a solid object within its physical dimensions at an altered orientation and having a different user orientation relative to the computing device according to another example embodiment of the present invention. As above with respect to FIGS. 3 and 4, FIG. 6 illustrates a hand-held computing device appearing to display a solid object within its physical dimensions at an additional altered orientation and having a different user orientation relative to the computing device according to another example embodiment of the present invention. FIGS. 3 and 4 are a special case of the examples shown in FIGS. 5 and 6. In the FIG. 3, the viewing direction is aligned with the gravity vector. This is not the most general case; nor is it comfortable ergonomically, as the viewer is likely to feel comfortable viewing at a slant as in FIG. 5. When the device is tilted an additional amount, the configuration of FIG. 6 occurs.

For this more general case, a modified projection algorithm is needed. First, define the "gravity vector" g, as a 3-vector. This vector is computed from the 2 accelerometer outputs a as follows:

$$g = \begin{pmatrix} a \\ \sqrt{1-a^2} \end{pmatrix} \equiv \begin{pmatrix} a_X \\ a_Y \\ \sqrt{1-a_x^2-a_y^2} \end{pmatrix} \quad (7)$$

Initialize as follows.
1. In the home configuration (which could be indicated by the user pressing a button to indicate "start viewing"), the accelerometer output a0 is recorded.
2. Calculate the gravity vector g0 from a0, using equation (7).

Iterate at successive time intervals, as follows:
1. Read the instantaneous accelerometer outputs a and calculate the gravity vector g from a, using equation (7).
2. Solve for $\theta$, $\phi$ in $$g = R_z(\theta) R_y(\phi) g_0 \quad (8)$$

to obtain the gravity vector in polar form $(\theta, \phi)$, where $$R_z(\theta) = \begin{pmatrix} \cos\theta & -\sin\theta & 0 \\ \sin\theta & \cos\theta & 0 \\ 0 & 0 & 1 \end{pmatrix} \text{ and } R_y(\phi) = \begin{pmatrix} \cos\phi & 0 & \sin\phi \\ 0 & 1 & 0 \\ -\sin\phi & 0 & \cos\phi \end{pmatrix} \quad (9)$$

3. Apply steps 2 to 5 from section 3.

Figure 7:
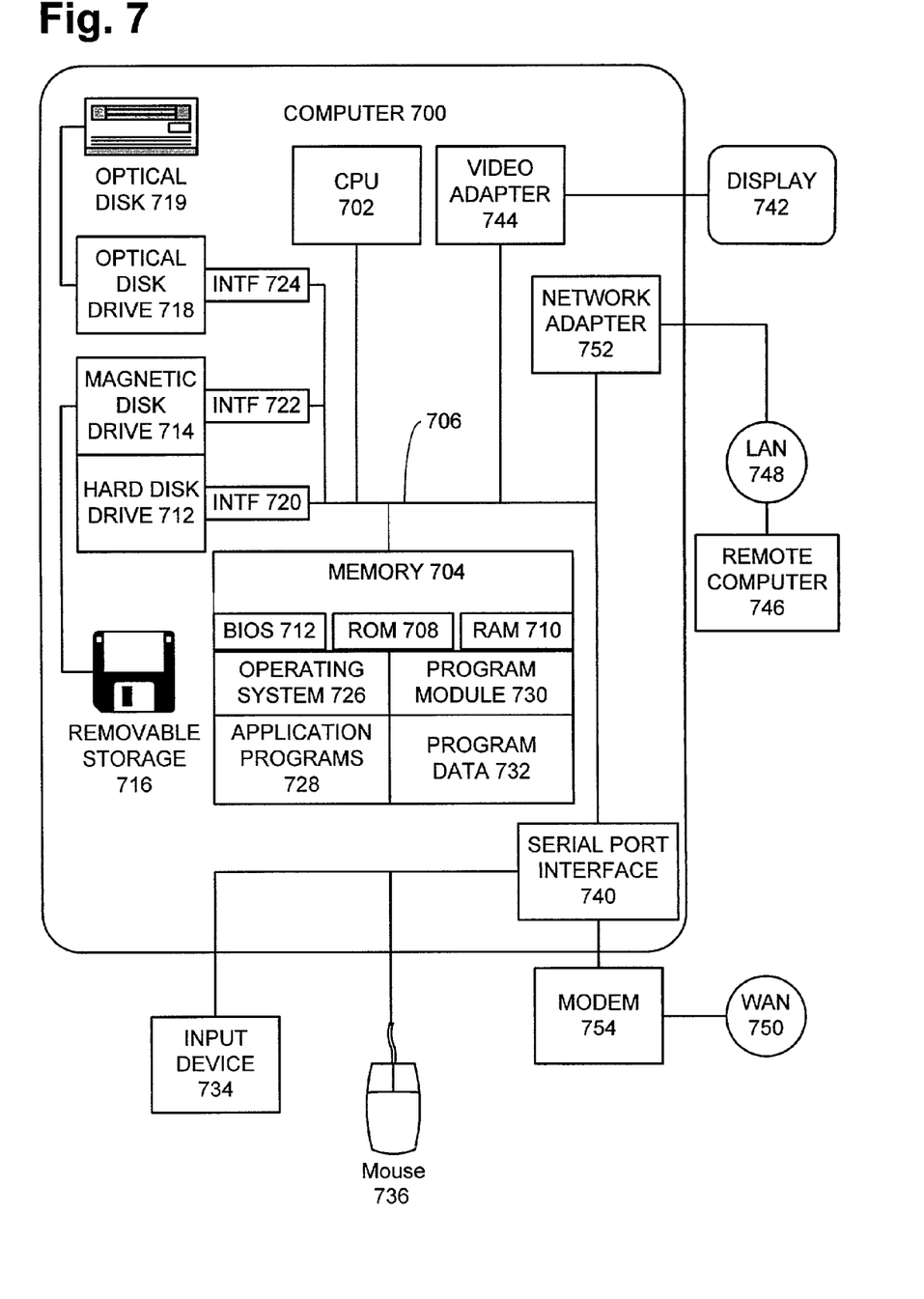
FIG. 7 illustrates an exemplary computing system that may be used to support various computing system that are part of example embodiments of the present invention.

With reference to FIG. 7, an exemplary computing system for embodiments of the invention includes a general purpose computing device in the form of a conventional computer system 700, including a processor unit 702, a system memory 704, and a system bus 706 that couples various system components including the system memory 704 to the processor unit 700. The system bus 706 may be any of several types of bus structures including a memory bus or memory controller, a peripheral bus and a local bus using any of a variety of bus architectures. The system memory includes read only memory (ROM) 708 and random access memory (RAM) 710. A basic input/output system 712 (BIOS), which contains basic routines that help transfer information between elements within the computer system 700, is stored in ROM 708.

The computer system 700 further includes a hard disk drive 712 for reading from and writing to a hard disk, a magnetic disk drive 714 for reading from or writing to a removable magnetic disk 716, and an optical disk drive 718 for reading from or writing to a removable optical disk 719 such as a CD ROM, DVD, or other optical media. The hard disk drive 712, magnetic disk drive 714, and optical disk drive 718 are connected to the system bus 706 by a hard disk drive interface 720, a magnetic disk drive interface 722, and an optical drive interface 724, respectively. The drives and their associated computer-readable media provide nonvolatile storage of computer readable instructions, data structures, programs, and other data for the computer system 700.

Although the exemplary environment described herein employs a hard disk, a removable magnetic disk 716, and a removable optical disk 719, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 719, ROM 708 or RAM 710, including an operating system 726, one or more application programs 728, other program modules 730, and program data 732. A user may enter commands and information into the computer system 300 through input devices such as a keyboard 734 and mouse 736 or other pointing device. Examples of other input devices may include a microphone, joystick, game pad, satellite dish, and scanner. For hand-held devices and tablet PC devices, electronic pen input devices may also be used. These and other input devices are often connected to the processing unit 702 through a serial port interface 740 that is coupled to the system bus 706. Nevertheless, these input devices also may be connected by other interfaces, such as a parallel port, game port, or a universal serial bus (USB). A monitor 742 or other type of display device is also connected to the system bus 706 via an interface, such as a video adapter 744. In addition to the monitor 742, computer systems typically include other peripheral output devices (not shown), such as speakers and printers.

The computer system 700 may operate in a networked environment using logical connections to one or more remote computers, such as a remote computer 746. The remote computer 746 may be a computer system, a server, a router, a network PC, a peer device or other common network node, and typically includes many or all of the elements described above relative to the computer system 700. The network connections include a local area network (LAN) 748 and a wide area network (WAN) 750. Such networking environments are commonplace in offices, enterprise-wide computer networks, intranets, and the Internet.

When used in a LAN networking environment, the computer system 700 is connected to the local network 748 through a network interface or adapter 752. When used in a WAN networking environment, the computer system 700 typically includes a modem 754 or other means for establishing communications over the wide area network 750, such as the Internet. The modem 754, which may be internal or external, is connected to the system bus 706 via the serial port interface 740. In a networked environment, program modules depicted relative to the computer system 700, or portions thereof, may be stored in the remote memory storage device. It will be appreciated that the network connections shown are exemplary, and other means of establishing a communication link between the computers may be used.

Figure 8:
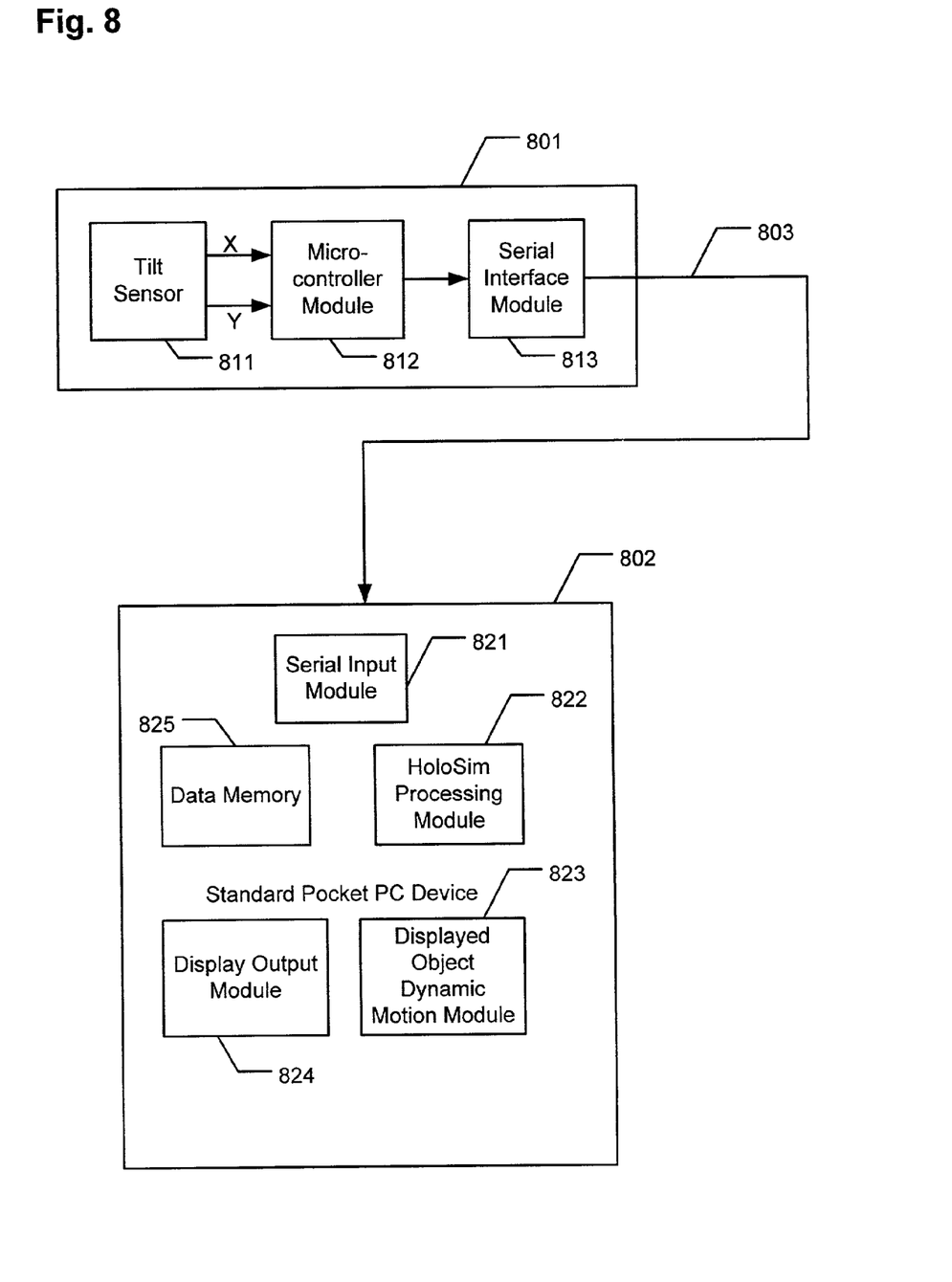
FIG. 8 illustrates a block diagram for an image manipulation and display processing system according to an embodiment of the present invention.

FIG. 8 illustrates a block diagram for an image manipulation and display processing system according to an embodiment of the present invention. In the example embodiment shown herein, the system includes an orientation measurement module 801, a hand-held computing system 802, and a serial connection between them 803.

The orientation measurement module 801 possesses a tilt sensor module 811, a microcontroller module 812, and a serial interface module 813. The tilt sensor module 811, which may be constructed using the ADXL 202 sensor as discussed above, generated an X and a Y static orientation measurement that is passed to the microcontroller module 812. The microcontroller module 812 performs all control and communications functions to obtain the orientation measurements and transmit them to the hand-held computer 802 as needed. The serial interface module 813 formats and transmits the data over the serial communications link in a desired protocol.

The hand-held computing system 802 possesses a set of processing modules to implement the HoloSim processing system. This set of processing modules includes a serial input module 821, a HoloSim processing module 822, a Displayed object dynamic motion module 823, a display output module 824, and a data memory module 825. The serial input module 821 receives and decodes the data transmitted over the serial communications link in the desired protocol. The HoloSim processing module 822 performs the location transformation and projection calculations needed to update a displayed image of an object. The Displayed object dynamic motion module 823 provides the processing needed to dynamically move an object within the field of view of the computer 802 if desired. The display output module 824 performs the display generation functions to output the 3D representation of the object onto the display of the computer 802. The data memory module 825 contains the data representations for the object and its projection onto the display screen of the computer 802 that is used by the other processing modules.

The serial connection between them 803 may be constructed as any serial connection between two digital processing devices such as an RS-232 connection, a USB connection, a Firewire connection or any other serial communication protocol. In addition, one skilled in the art will recognize that the orientation measurement module 801 may be integrated within the hand-held computer 802 where the tilt sensor 811 is a peripheral device of a processor within the hand-held computer 802 without deviating from the spirit and scope of the present invention as recited in the attached claims.

Figure 9:
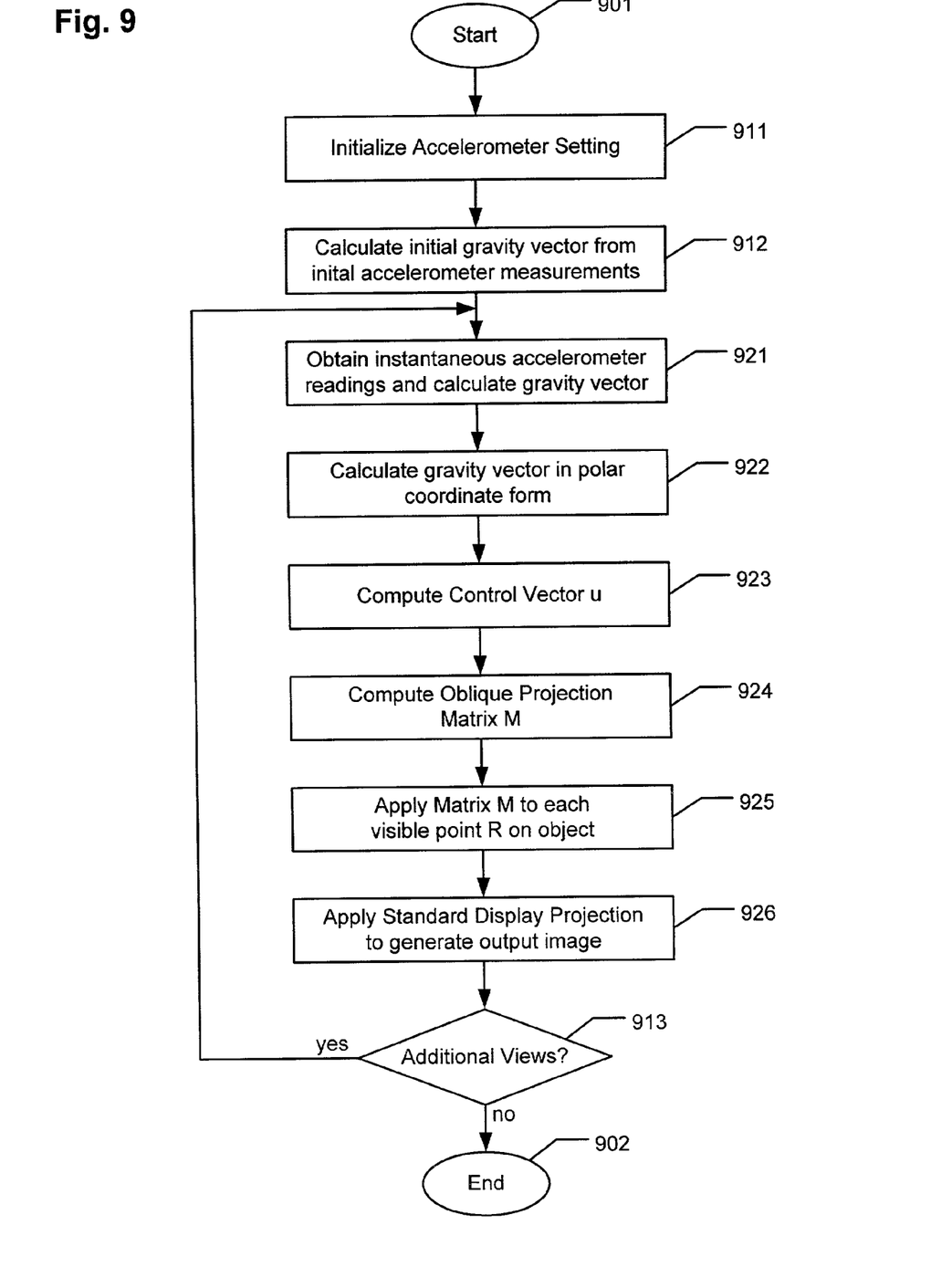
FIG. 9 illustrates an operational flow for an image manipulation and display processing system according to yet another example embodiment of the present invention.

FIG. 9 illustrates an operational flow for an image manipulation and display processing system according to yet another example embodiment of the present invention. The processing begins 901 and an initial set of accelerometer readings are obtained in module 911 in order to initialize the Holosim system to an initial orientation to begin the display of an object. These initial measurements are processed within module 912 to calculate an initial gravity vector.

Once the initialization process is completed, the display update process begins with a set of instantaneous accelerometer readings being obtained in module 921. A current measure of the gravity vector is calculated in polar form in module 922. The control vector u is calculated in module 923 and the Obique Projection Matrix M is calculated in module 924. These vectors are used in module 925 as matrix M is applied to each visible point R on the object. A standard display projection, along with hidden surface removal processing, is then applied to generated the output image in module 926. This output image is displayed to the user.

Test module 913 determines if an additional update for the output image is to be generated. If test module 913 determines that an additional output image is to be generated, the processing returns to module 921 where a new set of accelerometer readings are obtained and used in the generation of the next output image. If test module 913 determines that no additional output images are to be generated, the processing ends 902.

FIG. 7 illustrates an example of a suitable operating environment 700 in which the invention may be implemented. The operating environment is only one example of a suitable operating environment 700 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

A computing system 700 typically includes at least some form of computer readable media. Computer readable media can be any available media that can be accessed by the system 700. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

While the above embodiments of the present invention describe a processing system for altering an image displayed to a user, one skilled in the art will recognize that the various computing architectures may be used to implement the present invention as recited within the attached claims. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for altering an image displayed to a user based upon the proximity of the user to the display device.

What is claimed is:

1. A method for altering a computer generated image of an object displayed upon a display device, the display device having a display device orientation measurement module including a tilt sensor for obtaining a measure of a spatial orientation of the display device in at least two dimensions, and a Holosim processing module for applying an oblique projection matrix to all visible points on the object to generate the computer generated image of the object, the method comprising:
    obtaining a set of orientation measurements for the display device from the display device orientation measurement module;
    pre-processing the orientation measurements using a microcontroller processing module before transmission to a hand-held processing module;
    generating a transformation matrix using the set of orientation measurements for use in generating the computer generated image of an object; and
    applying the transformation matrix to all visible points within the computer generated image of an object.

2. The method according to claim 1, wherein the display device orientation measurement module transmits the orientation measurements to the hand-held processing module over a serial communications link.

3. A computer program data product readable by a computing system and encoding a set of computer instructions implementing a method for altering a computer generated image of an abject displayed upon a display device, the display device having a display device orientation measurement module for obtaining a measure of a spatial orientation of the display device, and a Holosim processing module for applying an oblique projection matrix to all visible points on the object to generate the computer generated image of the object, the method comprising:
    obtaining a set of orientation measurements for the display device from the display device orientation measurement module;
    pre-processing the orientation measurements using a microcontroller processing module before transmission to a hand-held processing module;
    generating a transformation matrix using the set of orientation measurements for use in generating the computer generated image of an object;
    applying the transformation matrix to all visible points within the computer generated image of an object.

4. The computer program data product according to claim 3, wherein the display device orientation measurement module comprises a tilt sensor for measuring the spatial orientation of the display device in at least two dimensions.

5. The computer program data product according to claim 3, wherein the display device orientation measurement module transmits the orientation measurements to the hand-held processing module over a serial communications link.

6. The computer program data product according to claim 3, wherein the computer program data product comprises a computer readable storage medium.

7. The computer program data product according to claim 3, wherein computer program data product comprises a readable data stream encoded and superimposed upon a carrier wave for transmission between comprising systems.

* * * * *